G. W. Hyatt,
Plate-Lifter,
Nº 16,058.            Patented Nov. 11, 1856.
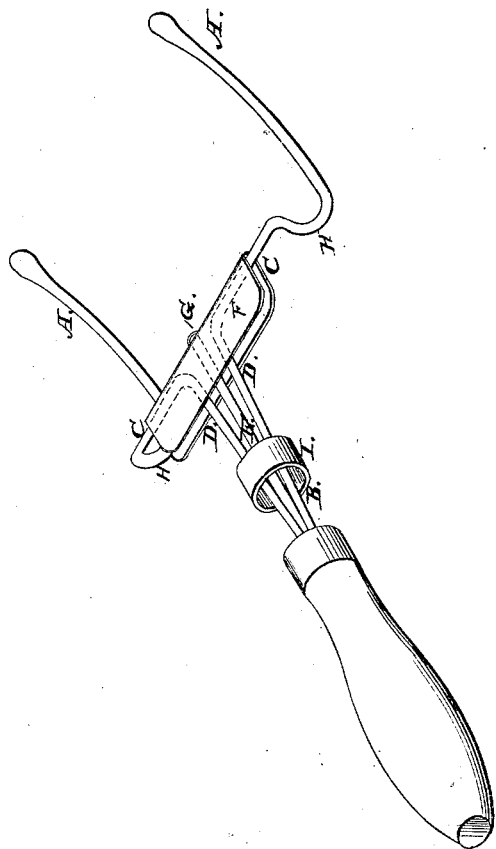
Witnesses:
A. Babbett
Avery E. Babbett
Inventor.
G. W. Hyatt.

UNITED STATES PATENT OFFICE.

G. W. HYATT, OF AUBURN, NEW YORK.

FORK FOR HANDLING HEATED PLATES.

Specification of Letters Patent No. 16,058, dated November 11, 1856.

*To all whom it may concern:*

Be it known that I, G. W. HYATT, of the city of Auburn, Cayuga county, in the State of New York, have invented a new and Improved Instrument for Removing to and from the Oven or Place of Cooking Plates, Pans, and other Articles Used for Cooking in other Ways and for other Purposes; and I do hereby declare that the following is a full, clear, and exact description thereof, reference being had to the accompanying drawing and to the letters of reference marked thereon.

The nature of my invention consists in forming a peculiar shoulder or recess in the tines of forks and arranging the tines in such a way as to steady the plate or object to be handled and to prevent its moving backward or sidewise.

My invention further consists in attaching to the tang or shank of the fork a clamp or spring in such a manner as to help support the tines and also to allow them to be expanded or contracted so as to suit plates or objects of different sizes.

My invention further consists in attaching to the tangs of the fork constructed as herein described a loose ring or ferrule that can be used as an additional support to the tines when the thing to be lifted is likely to force out the tines from the clamp or spring.

To enable others skilled in the art to make and use my invention, I proceed to describe its construction and operation.

I usually construct my plate and pan holder or lifter of common iron or brass wire of the size of about $\frac{1}{8}$ inch in diameter by forming or bending the same into the shape represented by the drawing between the letters A, B. The wires or tines are seen to pass into a spring clamp at C,—from both sides, and out of the same at D, and to enter the handle at B,—said spring or clamp may be made of any sheet metal of sufficient elasticity or spring to hold the tines in place and at the same time allow them to be expanded or contracted by the person using the fork. The bend downward and backward at H is for the purpose of allowing the edge of the plate or pan when received upon the holder to pass under the spring F, and thus prevent it from sliding toward the hand and to hold the same firm upon the tines.

The wire E is inserted into the handle immediately below the two tines, and extends forward and through the spring F, in front of which is a head G to prevent the said spring from being disturbed in its relation to other parts, and to increase the strength from the handle to the said spring. The object of said spring is to hold the several parts of the holder in their respective places, and also to hold the tines at whatever distance apart they may be placed for the purpose of adapting the same to articles of different sizes. The loose ring I is used for the purpose of preventing the tines of the holder from spreading too far apart.

Having thus described my improved fork I will state I am aware that forks for removing plates from ovens and for various other purposes have been made with a sort of shoulder or recess and that the tines, if bent at all are usually bent downward and forward, in fact such shoulders are always so far as I know made by bending the tines with a curve forward. My invention differs in this particular very essentially from all other forks, inasmuch as my fork to fully accomplish the desired object must be bent downward at nearly right angles, or downward and backward and a space must be left between the tines back of the point where the recess or shoulder is formed so that the plate or thing to be lifted particularly if of circular form will extend back under the tang or shank and thus rest against the shoulder in a way to prevent the plate from slipping backward or sidewise and when held or suspended in this position it is easier held and lifted than it could be with a fork made in the usual way. It will be seen that a pie plate cannot be so firmly held by any other fork known.

Therefore disclaiming all other forms, or modes of constructing forks I claim—

The clamp or spring F for the purpose of supporting the tines and also to allow them to be adjusted to suit a tine of different diameters.

G. W. HYATT.

Witnesses:
AVERY BABBETT,
AVERY E. BABBETT.